United States Patent
Fujii et al.

[11] Patent Number: 6,112,302
[45] Date of Patent: Aug. 29, 2000

[54] DEVICE FOR SETTING INITIALIZING DATA FOR EVERY DESTINATION IN ELECTRONIC DEVICE

[75] Inventors: Noriyuki Fujii; Tsutomu Sakamoto, both of Osaka, Japan

[73] Assignee: Funai Electric Co., Ltd., Osaka, Japan

[21] Appl. No.: 09/116,154

[22] Filed: Jul. 16, 1998

[30] Foreign Application Priority Data

Jul. 17, 1997 [JP] Japan ................ 9-006271 U

[51] Int. Cl.[7] ............... G06F 15/177; H04N 5/91
[52] U.S. Cl. ................... 713/1; 386/83
[58] Field of Search .................. 713/1, 2, 100; 386/83

[56] References Cited

U.S. PATENT DOCUMENTS

| | | | |
|---|---|---|---|
| 5,075,841 | 12/1991 | Kaneko | 395/575 |
| 5,261,104 | 11/1993 | Bertram | 713/1 |
| 5,349,664 | 9/1994 | Ikeda | 713/1 |
| 5,418,955 | 5/1995 | Ikeda | 713/1 |
| 5,479,342 | 12/1995 | Sakamoto | 364/184 |
| 5,488,409 | 1/1996 | Yuen | 348/5 |
| 5,621,579 | 4/1997 | Yuen | 386/121 |
| 5,677,979 | 10/1997 | Squicciarini | 386/46 |
| 5,737,477 | 4/1998 | Tsutsumi | 386/83 |

*Primary Examiner*—Joseph E. Palys
*Assistant Examiner*—Willie Martin
*Attorney, Agent, or Firm*—Lackenbach Siegel Marzullo Aronson & Greenspan, P.C.

[57] ABSTRACT

A device for setting initializing data for every destination in an electronic device has a microcomputer for controlling the electronic device and an external memory connected to the microcomputer. In the initializing-data setting device, the microcomputer includes: a ROM for storing in advance initializing data for microcomputer provided for every destination to be stored in the microcomputer and initializing data for external memory provided for every destination to be stored into the external memory; a destination designating unit for designating a destination; a destination determining unit for determining the designation contents by the destination designating unit in an initializing-data setting mode; and a CPU for performing such an operation in the initializing-data setting mode that the CPU reads out initializing data for microcomputer corresponding to a destination from the ROM on the basis of the result of determination made by the destination determining unit, and sets the read-out data in the external memory, and further reads out initializing data for external memory corresponding to the destination from the ROM, and sets the read-out data in the external memory.

3 Claims, 2 Drawing Sheets

```
INITIALIZING DATA FOR MICROCOMPUTER
01 :  1 SPEED / 40CH / ··· / ···
02 :  2 SPEED / 80CH / ··· / ···
03
04
 .
 .
 .
 .
16
```

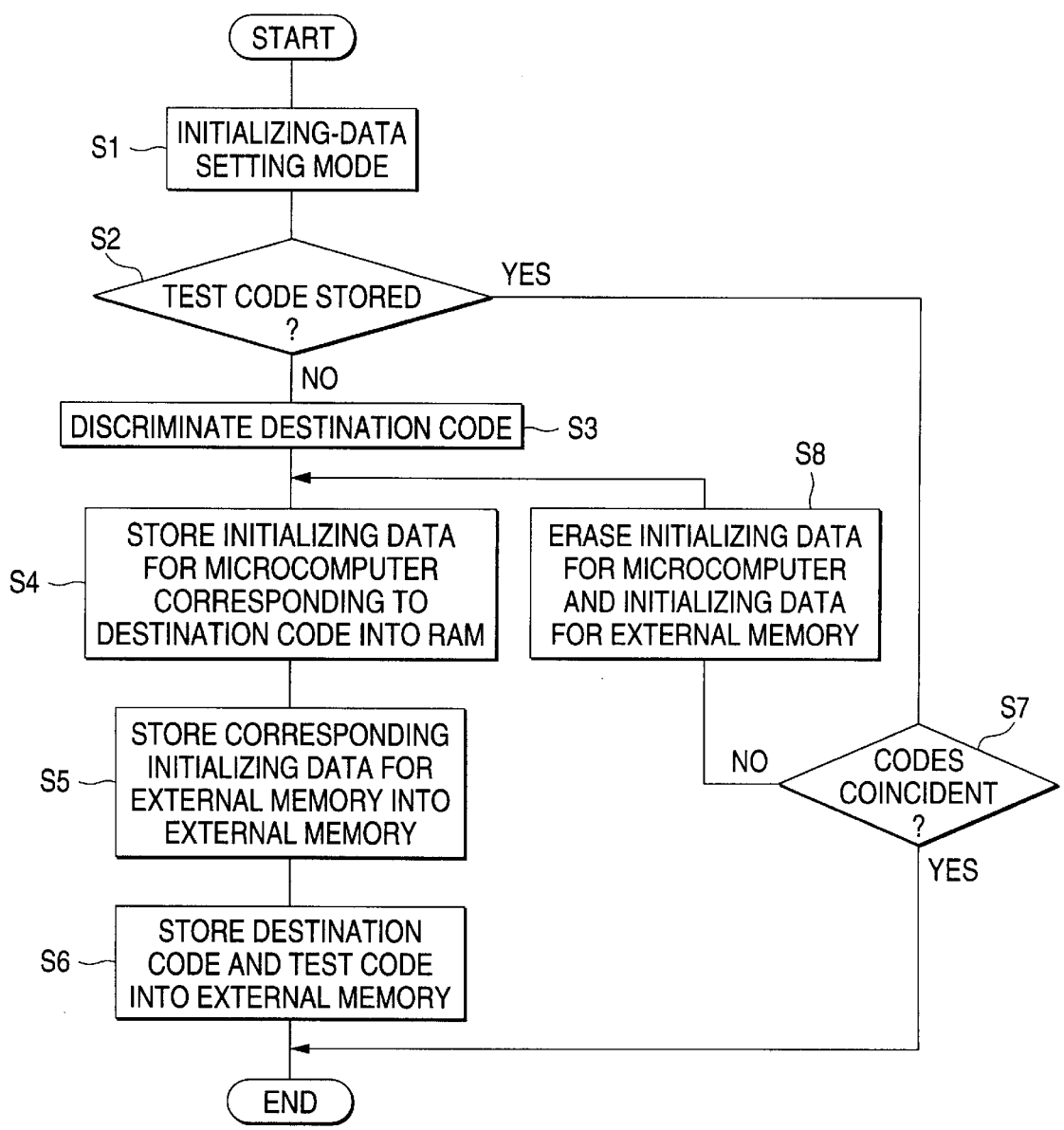

DEVICE FOR SETTING INITIALIZING DATA FOR EVERY DESTINATION IN ELECTRONIC DEVICE

BACKGROUND OF THE INVENTION

1. Field of the Invention

The present invention relates to a device for selecting, for every destination (that is, every country of shipment), the initializing data of a microcomputer incorporated in an electronic device such as a television set, a video cassette recorder, and a television set with a video cassette recorder integrally incorporated therein, and the initializing data of an external memory connected to the microcomputer, and for initializing the microcomputer and the external memory.

2. Description of the Related Art

A microcomputer is incorporated in an electronic device such as a television set, a video cassette recorder, and a television set with a video cassette recorder integrally incorporated therein. In exporting such electronic devices, it is a common practice that plural kinds of initializing data are contained in one microcomputer of each device, and when the destination or country to which the electronic devices are exported is determined, one kind of the initializing data specified by the destination is selected and set. It is not usual that the initializing data is changed for every destination and a mask is formed for every function grade of the electronic device.

In a known method to select one kind of the initializing data specified by the destination from the plural kinds of initializing data contained in the microcomputer, the required number of pull up/down resistors (or key matrix) corresponding to the number of destinations are externally connected to the microcomputer. In an initializing mode, a value of the pull up/down resistor (or the key matrix) is read, and then one kind of the initializing data specified by the destination is selected on the basis of the value.

By the way, the initializing data contained in the microcomputer includes the initializing data to be set in an external memory (e.g., $E^2PROM$) connected to the microcomputer, in addition to the initializing data for every destination to be set in the microcomputer per se. The initializing data for the external memory includes channel preset data, last channel (last watched channel) data and others, which are common to all the destinations. Thus, in the conventional electronic devices, the same initializing data (channel preset data, last channel data and others) is stored in the external memories regardless of the destination in the initializing-data setting mode.

On the other hand, some types of recent electronic devices which are exported to foreign countries include additional initializing data, e.g., data of video plus function, in addition to the channel preset data and the last channel data. Here, "video plus", which has been registered as a trademark in Japan, is a kind of timer programming system for recording. In the electronic devices having the video plus function, the data of video plus (i.e., guide channel data of vide plus) is stored into the external memory connected to the microcomputer.

However, since the guide channel data of video plus is not included in the initializing data stored in the microcomputer of the electronic device, it is impossible to store the guide channel data of video plus into the external memory in the initializing-data setting mode.

The video plus guide channel data may be added to the initializing data for the external memory of the microcomputer, regardless of the destinations. In this approach, the video plus function will improperly operate, however, since the guide channel data of video plus is different for every destination.

SUMMARY OF THE INVENTION

Accordingly, an object of the present invention is to provide a device capable of setting the video plus guide channel data corresponding to a destination into an external memory of a microcomputer in an initializing-data setting mode.

To achieve the above object, according to the present invention, there is provided a device for setting initializing data for every destination in an electronic device having a microcomputer for controlling the electronic device and an external memory connected to the microcomputer, the microcomputer comprising: an internal memory for storing in advance initializing data for microcomputer provided for every destination to be stored in the microcomputer and initializing data for external memory provided for every destination to be stored into the external memory; destination designating means for designating a destination; destination determining means for determining designation contents by the destination designating means in an initializing-data setting mode; microcomputer-side initializing-data setting means for reading out, in the initializing-data setting mode, initializing data for microcomputer corresponding to a destination specified by the result of determination made by the destination determining means from the internal memory, and setting the read-out data in the external memory; and external-memory-side initializing-data setting means for reading out, in the initializing-data setting mode, initializing data for external memory corresponding to the destination specified by the result of determination made by the destination determining means from the internal memory, and setting the read-out data in the external memory.

BRIEF DESCRIPTION OF THE DRAWINGS

FIG. 3 is a flow chart showing an operation of the initializing-data setting device for every destination of the invention.

DETAILED DESCRIPTION OF THE PREFERRED EMBODIMENT

Figures 1, 2:
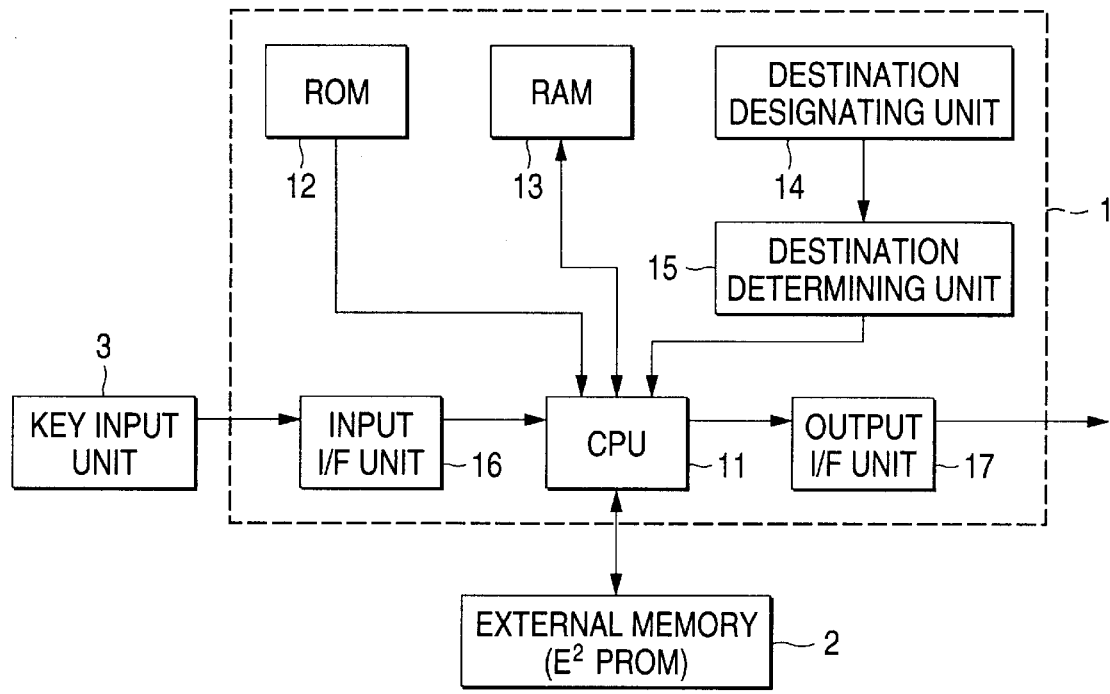
FIG. 1 is a block diagram showing an arrangement of a key portion of an electronic device incorporating therein a device for setting initializing data for every destination according to the present invention.
FIG. 2 is a diagram showing an example of initializing data for microcomputer for every destination.

The preferred embodiment of the present invention will be described with reference to the drawings.

In FIG. 1, reference numeral 1 designates a microcomputer; 2, an external memory; 3, a key input unit; 11, a CPU; 12, a ROM (internal memory); 13, a RAM; 14, a destination designating unit; 15, a destination determining unit; 16, an input I/F unit; and 17, an output I/F unit.

A device for setting initializing data for every destination according to the present invention is incorporated into an electronic device such as a television set, a video cassette recorder, and a television set with a video cassette recorder integrally incorporated therein. A key portion of the electronic device incorporating the initializing-data setting device is arranged as shown in FIG. 1. As shown, the electronic device is generally made up of the microcomputer 1, the external memory 2, and the key input unit 3. The microcomputer 1 includes the CPU 11, ROM 12, RAM 13, destination designating unit 14, destination determining unit 15, input I/F unit 16, and output I/F unit 17. The external memory 2 may be an E²PROM. The key input unit 3 may be a keyboard provided with ten keys, and various function keys.

The ROM 12 stores in advance an operation program. Additionally, the ROM 12 stores in advance the initializing data for microcomputer for every destination to be set in the RAM 13 of the microcomputer 1 in the initializing-data setting mode, and the initializing data for external memory for every destination to be set in the external memory 2 in the same mode.

FIG. 2 shows an example of initializing data for microcomputer for every destination. As shown, the initializing data pieces are presented for destination codes 01 to 16: "1SPEED/40CH/. . . " is the initializing data piece for the destination code 01, "2SPEED/80CH/. . . " is the initializing data piece for the destination code 02, and so on. The initializing data for external memory includes the initializing data common to all the destinations, e.g., channel preset data and last channel data, and further guide channel data of video plus provided for every destination in this embodiment. That is, the guide channel data pieces of video plus, like the initializing data pieces for microcomputer shown in FIG. 2, are respectively provided for the destination codes, and stored in the ROM 12.

The destination designating unit 14 is constructed with pull up/down resistors externally connected to the microcomputer 1. The number of pull up/down resistors corresponds to that of the destinations, or the countries to which the products are exported. The pull up/down resistors may be replaced with a key matrix.

The destination determining unit 15 determines the destination code set by the pull up/down resistors of the destination designating unit 14, and outputs the result of the determination to the CPU 11.

In the initializing-data setting mode, the CPU 11 reads out of the ROM 12 the initializing data for microcomputer specified by the destination code received from the destination determining unit 15, and stores the read-out data into the RAM 13.

Also in the initializing-data setting mode, the CPU 11 reads out the initializing data for external memory (including the channel preset data, the last channel data and the like) from the ROM 12, and stores the resultant data into the external memory 2. Further, it reads out of the ROM 12 the initializing data for external memory (guide channel data of video plus), specified by the received destination code, and stores the resultant data into the external memory 2. Further, in this mode, the CPU 11 stores a test code indicating that the initializing data has been set, together with the destination code received from the destination determining unit 15, into the external memory 2.

In an initializing mode other than the initializing-data setting mode, the CPU 11 compares the destination code as the result of the determination made by the destination determining unit 15 with the destination code stored in the external memory 2. If those codes are not coincident with each other, the CPU 11 stores the initializing data for microcomputer and the initializing data for external memory, both being specified by the destination code coming from the destination determining unit 15 respectively into the RAM 13 and the external memory 2.

Thus, the data stored in the external memory 2 are the destination code, the test code, the initializing data for external memory (channel preset data, last channel data and the like) common to all the destinations, and the initializing data for external memory (guide channel data of video plus) corresponding to the destination code.

When the microcomputer 1 is placed to the initializing mode other than the initializing-data setting mode, the CPU 11 checks if a test code is stored in the external memory 2. If the answer is yes, the CPU 11 does not perform the initialization.

Next, the operation of the initializing-data setting device thus constructed will be described with reference to a flow chart shown in FIG. 3.

Electric power is supplied to the electronic device by, for example, inserting a plug of a power cord into a suitable outlet. Then, an initializing-data setting mode is set up in the microcomputer 1 (step S1). At this time, the CPU 11 checks if a test code is stored in the external memory 2 (step S2). If it is not stored, the CPU 11 executes an initializing-data setting operation. That is, the destination determining unit 15 discriminates a destination code set by the pull up/down resistors of the destination designating unit 14, and outputs the discriminated destination code to the CPU 11 (step S3).The CPU 11 reads out the initializing data for microcomputer specified by the destination code received from the destination determining unit 15 from the ROM 12, and stores the read-out data into the RAM 13 (step S4).

Further, the CPU 11 reads out the initializing data for external memory (channel preset data and last channel data) from the ROM 12, and stores it into the external memory 2, and reads out the initializing data for external memory (guide channel data of video plus) specified by the destination code from the ROM 12 and stores it into the external memory 2 (step S5).

Furthermore, the CPU 11 stores the destination code received from the destination determining unit 15 into the external memory 2, and further stores a test code indicating that the initializing data has been set into the same memory (step S6). Thus, the operation of the initializing data setting mode by the microcomputer 1 ends.

On the other hand, in step S2, if a test code is stored, it is determined that the initializing data has been set, and therefore the microcomputer 1 advances its operation from step S2 to step S7. Specifically, the CPU 11 compares the destination code derived from the destination determining unit 15 with the destination code stored in the external memory 2 (step S7). If both the codes are coincident with each other, it is determined that the initializing data setting operation for the destination code has ended and therefore the CPU 11 ends the operation of the initializing data setting mode.

On the other hand, if those destination codes are not coincident with each other, the CPU 11 erases the initializing data for microcomputer in the RAM 13 and the initializing data for external memory (including destination code and test code) in the external memory 2 (step S8), and stores the initializing data for microcomputer that is specified by the destination code output from the destination determining unit 15 into the RAM 13 (step S4), and stores the initializing data for external memory, destination code and test code into the external memory 2 (steps S5 and S6). In other words, the CPU 11 rewrites the RAM 13 and the external memory 2.

In the above embodiment, the guide channel data of video plus is used for the initializing data for external memory provided for every destination. Any data to be stored into the external memory 2, if its contents are different for every destination, may be handled as the initializing data for external memory in the present-invention.

As apparent from the foregoing description, according to the invention, the initializing data for external memory corresponding to each destination is automatically set into the external memory in a simple manner that an electric power is supplied to the electronic device and a desired destination is designated. Thus, the external memory can be initialized so simply.

What is claimed is:

1. A programmable video recording device (VCR) for setting initializing data for every destination and having a microcomputer for controlling the electronic device and an external memory connected to the microcomputer, said microcomputer comprising:

an internal memory for storing in advance initializing data for microcomputer provided for every destination to be stored in said microcomputer and initializing data for external memory provided for every destination to be stored into said external memory;

destination designating means for designating a destination;

destination deterring means for determining designation contents by said destination designating means in an initializing-data setting mode; microcomputer-side initializing-data setting means for reading out, in the initializing-data setting mode, initializing data for microcomputer corresponding to a destination specified by the result of determination made by said destination determning means from said internal memory, and setting the read-out data in said external memory; and external-memory-side initializing-data setting means for reading out, in the initializing-data setting mode, initializing data for external memory corresponding to the destination specified by the result of determination made by said destination determinsing means from said internal memory, and setting the read-out data in said external memory.

2. A device for setting initializing data for every destination in an electronic device having a microcomputer for controlling the electronic device and an external memory connected to the microcomputer, said microcomputer comprising:

an internal memory for storing in advance initializing data for microcomputer provided for every destination to be stored in said microcomputer and initializing data for external memory provided for every destination to be stored into said external memory;

destination designating means for designating a destination;

destination determining means for determining designation contents by said destination designating means in an initializing-data setting mode;

microcomputer-side initializing-data setting means for reading out, in the initializing-data setting mode, initializing data for microcomputer corresponding to a destination specified by the result of determination made by said destination determining means from said internal memory, and setting the read-out data in said external memory; and external-memory-side initializing-data setting means for reading out, in the initializing-data setting mode, initializing data for external memory corresponding to the destination specified by the result of determination made by said destination determining means from said internal memory, and setting the read-out data in said external memory;

comparing means for comparing a destination code derived from said destination determining means with a destination code stored in said external memory in an initializing mode other than the initializing-data setting mode, the destination code derived from said destination determining means being stored into said external memory in the initializing-data setting mode; and control means for performing such a control that when the result of comparison by said comparing means shows that the destination codes compared are not coincident with each other, said control means controls said microcomputer-side initializing-data setting means and said exteral-memory-side initializing-data setting means so that initializing data specified by the destination code derived from said destination determining means is set.

3. A device for setting initializing data for every destination in an electronic device having a microcomputer for controlling the electronic device and an external memory connected to the microcomputer, said microcomputer comprising:

an internal memory for storing in advance initializing data for microcomputer provided for every destination to be stored in said microcomputer and initializing data for external memory provided for every destination to be stored into said external memory;

destination designating means for designating a destination;

destination determining means for determining designation contents by said destination designating means in an initializing-data setting mode;

microcomputer-side initializing-data setting means for reading out, in the initializing-data setting mode, initializing data for microcomputer corresponding to a destination specified by the result of determination made by said destination determining means from said internal memory, and setting the read-out data in said external memory; and external-memory-side initializing-data setting means for reading out, in the initializing-data setting mode, initializing data for external memory corresponding to the destination specified by the result of determination made by said destination determining means from said internal memory, and setting the read-out data in said external memory, the initializing data for external memory provided for every destination, stored in said internal memory, containing guide channel data of a timer programming system.

* * * * *